United States Patent Office 3,712,937
Patented Jan. 23, 1973

3,712,937
S-(1,3 - DIHALO-PROP-2-YL-MERCAPTOMETHYL)-THIOL AND THIONOTHIOL PHOSPHORIC AND PHOSPHONIC ACID ESTERS
Gerhard Schrader, Wuppertal-Cronenberg, and Ingeborg Hammann, Cologne, Germany, assignors to Farbenfabriken Bayer Aktiengesellschaft, Leverkusen, Germany
No Drawing. Filed Feb. 2, 1970, Ser. No. 7,984
Claims priority, application Germany, Feb. 10, 1969,
P 19 06 490.5
Int. Cl. C07f 9/16, 9/40; A01n 9/36
U.S. Cl. 260—948                10 Claims

ABSTRACT OF THE DISCLOSURE

S-(1,3-dihalo-prop-2-yl-mercaptomethyl)-thiol and thionothiol phosphoric and phoshonic acid esters, i.e. (alkyl and O - alkyl)-O-alkyl-S-(1,3-dihalo-prop-2-yl-mercaptomethyl)-thiol and thionothiol phosphoric and phosphonic acid esters, which possess arthropodicidal, especially acaricidal and insecticidal, properties as well as selective rodenticidal properties.

---

The present invention relates to and has for its objects the provision for particular new S-(1,3-dihalo-prop-2-yl-mercaptomethyl)-thiol and thionothiol phosphoric and phosphonic acid esters, i.e. (alkyl and O-alkyl)-O-alkyl-S-(1,3-dihalo-prop-2-yl-mercaptomethyl)-thiol and thionothiol phosphoric and phosphonic acid esters, which possess arthropodicidal, especially insecticidal and acaricidal, properties, as well as selective rodenticidal properties, active compositions in the form of mixtures of such compounds with solid and liquid dispersible carrier vehicles, and methods for producing such compounds and for using such compounds in a new way, especially for combating pests, e.g. arthropods and rodents, with other and further objects becoming apparent from a study of the within specification and accompanying examples.

In U.S. Pat. 1,949,629, there is described the reaction of 1,2-dichloro-ethane with the ammonium salt of O,O-diisopropyl-thionothiolphosphoric acid, in which the O,O-di-isopropyl - S - (2-chloro-ethyl)-thionothiolphosphoric acid ester is said to be produced in the first step of the reaction. The isolation or purfiication of this hypothetical intermediate product is, however, not disclosed.

According to the particulars given in U.S. Pat. 2,266,-514, the above mentioned compound is said to be obtained by reaction of equimolar amounts of the aforesaid starting materials, but details in respect of purity and yields of the product are lacking.

Finally, from German Pat. 1,005,058, it is known that symmetrical 1,2-dihalo-ethanes, for example is dichloro-ethane or dibromo-ethane, in general, react with O,O-di-alkylthiol- or -thionothiol-phosphoric acid salts, with the exchange of both halogen atoms for the thiolphosphoric acid radical. A selective substitution of the halogen atoms is possible, according to the particulars given in said German patent in the case of reaction with O,O-dialkyl thionothiolphosphoric acid salts, only when the reaction is carried out in aqueous solution, whereas the reaction with the salts of the appropriate thiolphosphoric acids only leads to the desired successful result when methylethyl ketone specifically is used as solvent.

Apart from the foregoing, the compound O,O-dimethyl-S-(β-ethylmercapto-ethyl)-thionothiol phosphoric acid ester (A) is known to possess insecticidal and acaricidal properties.

It has now been found, in accordance with the present invention, that the particular new phosphorus acid esters, i.e. S-(1,3-dihalo-prop - 2 - yl-mercaptomethyl)-thiol and thionothiol phosphoric and phosphonic acid esters, of the formula $$\begin{array}{c} R_1 \quad X \\ \diagdown \| \\ P-S-CH_2-S-CH \\ \diagup \quad\quad\quad\quad\quad \diagdown \\ R_2O \quad\quad\quad\quad\quad CH_2-Hal'' \end{array} \begin{array}{c} CH_2-Hal' \\ \diagup \\ \\ \end{array} \quad (I)$$

in which $R_1$ is alkyl of 1–4 carbon atoms or alkoxy of 1–4 carbon atoms,
$R_2$ is alkyl of 1–4 carbon atoms,
X is oxygen or sulfur, and
Hal' and Hal'' each individually is chloro or bromo, exhibit strong arthropodicidal, especially insecticidal and acaricidal, as well as selective rodenticidal properties.

It has been furthermore found, in accordance with the present invention, that the particular new compounds of Formula I above may be produced smoothly and without side reactions by the process which comprises reacting a thiol- or thionothiol-phosphoric (-phosphonic) acid salt of the formula $$\begin{array}{c} R_1 \quad X \\ \diagdown \| \\ P-S-M \\ \diagup \\ R_2O \end{array} \quad (II)$$

in which $R_1$, $R_2$ and X are the same as defined above, and
M is a monovalent metal equivalent, e.g. alkali metal ion such as sodium or potassium, or an ammonium group, with a halomethyl-1,3-dihalo-prop-2-yl thioether of the formula $$\begin{array}{c} \quad\quad\quad\quad\quad CH_2-Hal' \\ \quad\quad\quad\quad\quad \diagup \\ Hal-CH_2-S-CH \\ \quad\quad\quad\quad\quad \diagdown \\ \quad\quad\quad\quad\quad CH_2-Hal'' \end{array} \quad (III)$$

in which

Hal' and Hal'' are the same as defined above, and
Hal is chloro or bromo, especially chloro, preferably in the presence of an organic solvent.

The smooth and uniform course of the instant production process could in no way be foreseen. It was surprising that only one of the three halogen atoms is substituted in the reaction.

Advantageously, the particular new compounds of Formula I above are distinguished by outstanding insecticidal and acaricidal properties as well as, in most cases, extremely low phytotoxicity and concomitantly low toxicity to warm-blooded animals. It is decidedly surprising that the compounds according to the present invention are superior to the closest comparable known compounds of analogous constitution and the same type of activity such as compound (A) noted above. Furthermore, the instant compounds exhibit a good rodenticidal secondary activity. The compounds of the present invention therefore represent a valuable contribution to the art.

The course of the reaction for producing the particular new compounds according to the present invention can be represented by the following formula scheme:

$$\begin{array}{c} R_1 \quad X \\ \diagdown \| \\ P-S-M \\ \diagup \\ R_2O \end{array} + \begin{array}{c} \quad\quad\quad\quad\quad CH_2-Hal' \\ \quad\quad\quad\quad\quad \diagup \\ Hal-CH_2-S-CH \\ \quad\quad\quad\quad\quad \diagdown \\ \quad\quad\quad\quad\quad CH_2-Hal'' \end{array} \longrightarrow$$

(II)        (III)

$$\begin{array}{c} R_1 \quad X \\ \diagdown \| \\ P-S-CH_2-S-CH \\ \diagup \quad\quad\quad\quad\quad \diagdown \\ R_2O \quad\quad\quad\quad\quad CH_2-Hal'' \end{array} \begin{array}{c} CH_2-Hal' \\ \diagup \\ \\ \end{array}$$

(I)

The starting materials are clearly characterized by Formulae II and III noted above.

Advantageously, in accordance with the present invention, in the various formulae herein:

$R_1$ represents
straight and branched chain lower alkyl hydrocarbon of 1–4 carbon atoms such as methyl, ethyl, n- and iso-propyl, n-, iso-, sec.- and tert.-butyl, and the like, especially methyl to sec.-butyl inclusive, and more especially $C_{1-3}$ or $C_{1-2}$ alkyl; and
straight and branched chain lower alkoxy of 1–4 carbon atoms such as methoxy, ethoxy, n- and iso-propoxy, n-, iso-, sec.- and tert.-butoxy, and the like, especially methoxy to sec.-butoxy inclusive, and more especially $C_{1-3}$ or $C_{1-2}$ alkoxy;

$R_2$ represents
straight and branched chain lower alkyl hydrocarbon of 1–4 carbon atoms such as methyl to tert.-butyl inclusive as defined above, and the like, especially methyl to sec.-butyl inclusive, and more especially $C_{1-3}$ or $C_{1-2}$ alkyl;

X represents
oxygen; or
sulfur; and
especially sulfur; and

Hal' and Hal" each individually represents
chloro; or
bromo;
with Hal' being especially chloro or bromo, and Hal" being especially chloro.

Prefereably, $R_1$ is $C_{1-3}$ or $C_{1-2}$ alkyl; or $C_{1-3}$ or $C_{1-2}$ alkoxy; $R_2$ is $C_{1-3}$ or $C_{1-2}$ alkyl; X is oxygen; or sulfur; Hal' is chloro; or bromo; and Hal" is chloro.

In particular, $R_1$ is $C_{1-2}$ alkyl; or $C_{1-2}$ alkoxy; $R_2$ is $C_{1-2}$ alkyl; X is oxygen; or sulfur; Hal' is chloro; or bromo; and Hal" is chloro.

The halomethyl-1,3-dihalo-prop-2-yl thioethers of Formula III above required as starting materials are readily obtainable, even on an industrial scale, for example in the following way:

3-halo-propylene sulfides are converted with the aid of concentrated halogen hydracids into the appropriate 1,3-dihalo-prop-2-yl-mercaptans (cf. "Houben-Weyl, Die Methoden der organischen Chemie," 4th edition, vol. IX, page 160). For example, from 3-chloro-propylene sulfide, which can be prepared in simple manner, there is formed, according to the following reaction scheme, by reaction with concentrated hydrochloric acid, the corresponding 1,3-dichloro-prop-2-yl-mercaptan, and with concentrated hydrobromic acid the appropriate 1-bromo-3-chloro-propyl compound:

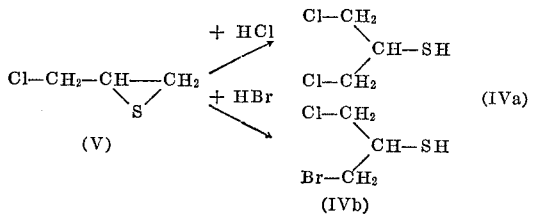

The 1,3-dihalo-prop-2-yl-mercaptans can then be reacted according to known methods, by means of formaldehyde and halogen hydride, to give the desired halomethyl-1,3-dihalo-prop-2-yl thioethers of Formula III above, in accordance with the following reaction scheme:

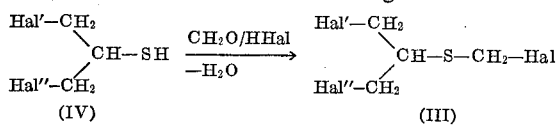

The production process of the present invention, as mentioned above, is preferably carried out in the presence of an organic solvent. As such, practically all organic solvents inert to the reactants are suitable. These include hydrocarbons, such as benzine, benzene, toluene, xylene and chlorobenzene; ethers, for example diethyl and dibutyl ether, dioxan and tetrahydrofuran; alcohols, such as methanol, ethanol, n-propanol and iso-propanol; and the like.

As solvent, particularly good results have been obtained with low-boiling aliphatic ketones or nitriles, such as acetone, methylethyl ketone, methylisobutyl ketone, methylisopropyl ketone, acetonitrile, propionitrile, and the like.

The production reaction of the present invention may be carried out within a fairly wide temperature range. In general, the reaction is carried out at substantially between about 0–100° C. or at the boiling point of the mixture, and preferably between about 10–60° C.

According to the formula scheme noted above, one mol of the halomethyl-1,3-dihalo-prop-2-yl thioether of Formula III above is needed per mol of the thiol- or thionothiol-phosphoric (-phosphonic) acid salt of Formula II above.

Expediently, a mixture of the (thiono) thiolphosphoric (-phosphonic) acid salt of Formula II above and one of the above-mentioned solvents, preferably acetonitrile, is provided, and the halomethyl-1,3-dihalo-prop-2-yl thioether of Formula III above is added dropwise to this mixture. After completion of the addition, the reaction mixture is stirred until completion of the reaction, generally for a further 1 to 4 hours, optionally with heating, and then cooled to room temperature. The working up of the reaction mixture may take place in customary manner by pouring out the mixture into water, taking up the separated (in oily form) reaction product in one of the above-mentioned hydrocarbons, preferably benzene, washing and drying the organic phase, and finally evaporating the solvent.

The particular new compounds of the present invention are obtained in most cases in the form of colorless to slightly yellow-colored, water-insoluble oils which cannot, even under greatly reduced pressure, be distilled without decomposition.

As already mentioned above, the thiol or thionothiolphosphoric or -phosphonic acid esters according to the present invention are distinguished by outstanding insecticidal, acaricidal and, to some extent, rodenticidal, properties, with, in some cases, extremely low phytotoxicity and concomitantly low mammalian toxicity. The pesticidal effect sets in rapidly and is long-lasting. The instant active compounds are therefore used with markedly good success in crop protection endeavors for the control of noxious sucking and biting insects, Diptera and mites (Acari), as well as of destructive rodents.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Melgethes aeneus*), the raspberry beetle (*Byturus tomentosus*), the bean weevil (*Bruchidius=Acanthoscellides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegpti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chloro-benzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselghur, clays, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, rodenticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Significantly, for rodenticidal purposes, the active compounds may also be mixed with bait materials of animal or vegetable origin, for example, ground cereal products, meat meal, fish meal, and the like.

Furthermore, the present invention contemplates methods of selectively killing, combating or controlling pests, e.g. arthropods, i.e. insects and acarids, as well as rodents, i.e. short-tailed mice, and more particularly methods of combating at least one of insects and acarids which comprises applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, squirting, pouring, fumigating, and the like (and even by poisoning of drinking water or by laying, above ground and below ground, food baits and play baits into which the active compounds are incorporated, as well as by fumigation in rooms or subterranean burrows).

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

Plutella test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (Brassica oleracea) are sprayed with the preparation of the given active compound until dew moist and are then infested with caterpillars of the diamond-back moth (Plutella maculipennis).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 1.

TABLE 1
[Plutella test]

| Active compound (constitution) | Concentration of active compound in percent | Degree of destruction in percent after 3 days |
|---|---|---|
| (A) $(CH_3O)_2\overset{S}{\underset{\parallel}{P}}-S-CH_2-CH_2-S\ C_2H_5$ (Known comparative compound) | 0.1<br>0.01 | 100<br>20 |
| (1₁) $(C_2H_5O)_2\overset{S}{\underset{\parallel}{P}}-S-CH_2-S-\overset{CH_2-Br}{\underset{CH_2-Cl}{\overset{\mid}{CH}}}$ | 0.1<br>0.01 | 100<br>95 |
| (2₁) $\overset{C_2H_5}{\underset{C_2H_5O}{>}}\overset{S}{\underset{\parallel}{P}}-S-CH_2-S-\overset{CH_2-Br}{\underset{CH_2-Cl}{\overset{\mid}{CH}}}$ | 0.1<br>0.01 | 100<br>100 |

TABLE 1—Continued

| Active compound (constitution) | Concentration of active compound in percent | Degree of destruction in percent after 3 days |
|---|---|---|
| (3₁) | 0.1<br>0.01<br>0.001 | 100<br>100<br>90 |

EXAMPLE 2

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage plants (Brassica oleracea) which have been heavily infested with peach aphids (Myzus persicae) are sprayed with the prepartion of the given active compound until dripping wet.

After the specified period of time, the degree of destruction is determined as a percentage: 100% means that all the aphids are killed, whereas 0% means that none of the aphids are killed.

The particular active compounds tested, their concentrations, the valuation time and the results obtained can be seen from the following Table 2.

TABLE 2
[Myzus test]

| Active compound | Concentration of active compound in percent | Degree of destruction in percent after 24 hours |
|---|---|---|
| (4₁) $(CH_3O)_2\overset{S}{\underset{\parallel}{P}}-S-CH_2-S-\overset{CH_2-Br}{\underset{CH_2-Cl}{\overset{\mid}{CH}}}$ | 0.1<br>0.01 | 100<br>99 |
| (1₂) $(C_2H_5O)_2\overset{S}{\underset{\parallel}{P}}-S-CH_2-S-\overset{CH_2-Br}{\underset{CH_2-Cl}{\overset{\mid}{CH}}}$ | 0.1<br>0.01<br>0.001 | 100<br>100<br>100 |
| (5₁) $(C_2H_5O)_2\overset{O}{\underset{\parallel}{P}}-S-CH_2-S-\overset{CH_2-Br}{\underset{CH_2-Cl}{\overset{\mid}{CH}}}$ | 0.1<br>0.01 | 100<br>80 |
| (2₂) $\overset{C_2H_5}{\underset{C_2H_5O}{>}}\overset{S}{\underset{\parallel}{P}}-S-CH_2-S-\overset{CH_2-Br}{\underset{CH_2-Cl}{\overset{\mid}{CH}}}$ | 0.1<br>0.01<br>0.001 | 100<br>100<br>100 |
| (6₁) $(C_2H_5O)_2\overset{S}{\underset{\parallel}{P}}-S-CH_2-S-\overset{CH_2-Cl}{\underset{CH_2-Cl}{\overset{\mid}{CH}}}$ | 0.1<br>0.01<br>0.001 | 100<br>100<br>100 |
| (3₂) $\overset{C_2H_5}{\underset{C_2H_5O}{>}}\overset{S}{\underset{\parallel}{P}}-S-CH_2-S-\overset{CH_2-Cl}{\underset{CH_2-Cl}{\overset{\mid}{CH}}}$ | 0.1<br>0.01<br>0.001 | 100<br>100<br>95 |

EXAMPLE 3

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the preparation of the given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 3.

TABLE 3

*Tetranychus urticae* test

| Active compound (constitution) | Concentration of active compound in percent | Degree of destruction in percent after 48 hours |
|---|---|---|
| (A) (CH₃O)₂P(=S)—S—CH₂—CH₂—SC₂H₅ (Known comparative compound) | 0.1 | 40 |
| (1₃) (C₂H₅O)₂P(=S)—S—CH₂—S—CH(CH₂—Br)(CH₂—Cl) | 0.1 / 0.01 | 100 / 90 |
| (5₂) (C₂H₅O)₂P(=O)—S—CH₂—S—CH(CH₂—Br)(CH₂—Cl) | 0.1 | 100 |
| (2₃) (C₂H₅)(C₂H₅O)P(=S)—S—CH₂—S—CH(CH₂—Br)(CH₂—Cl) | 0.1 / 0.01 | 100 / 100 |
| (6₂) (C₂H₅O)₂P(=S)—S—CH₂—S—CH(CH₂—Cl)(CH₂—Cl) | 0.1 / 0.01 / 0.001 | 100 / 99 / 60 |
| (7₁) (C₂H₅O)₂P(=O)—S—CH₂—S—CH(CH₂—Cl)(CH₂—Cl) | 0.1 | 99 |
| (3₃) (C₂H₅)(C₂H₅O)P(=S)—S—CH₂—S—CH(CH₂—Cl)(CH₂—Cl) | 0.1 / 0.01 / 0.001 | 100 / 99 / 80 |

The following further examples are set forth to illustrate, without limitation, the manner of producing the active compounds according to the present invention:

EXAMPLE 4

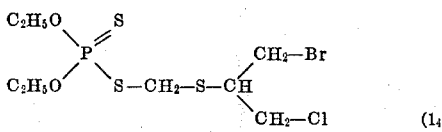
(1₄)

0.3-molar mixture:

69 g. potassium O,O-diethyl-thionothiolphosphate are suspended in 300 ml. acetonitrile. To this suspension there are added at +10° C., with stirring, 72 g. chloromethyl-1-bromo-3-chloro-prop-2-yl thioether. The temperature of the mixture rises spontaneously to about 30 to 40° C. The reaction mixture is heated to 45° C. for a further hour and then poured into 300 ml. ice water. The separated oil is taken up in 200 ml. benzene, the benzene solution is separated, washed several times with, in each case, 50 ml. water; and, finally, the organic layer is dried over sodium sulfate. After the solvent has been distilled off, there remain behind 105 g. (90% of the theory) of O,O - diethyl - S - (1 - bromo - 3 - chloro - prop - 2 - yl-mercaptomethyl) - thionothiolphosphoric acid ester as slightly yellow, water-insoluble oil.

Calculated for a molecular weight of 388 (percent): P, 8.0; S, 24.8. Found (percent): P, 8.2; S, 25.1.

EXAMPLE 5

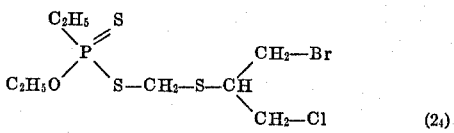
(2₄)

0.3-molar mixture:

72 g. chloromethyl-1-bromo-3-chloro-propyl-2-yl thioether are added at +10° C. with vigorous stirring, to a solution of 63 g. potassium ethyl-O-ethyl-thionothiolphosphonate in 300 ml. acetonitrile. The temperature of the mixture rises slowly to 40° C. The mixture is heated to 45° C. for a further hour and is then worked up as described in the preceding example. There are thus obtained 100 g. (90% of the theory) of ethyl-O-ethyl-S-(1-bromo-3 - chloro - prop - 2 - yl-mercaptomethyl)-thionothiolphosphonic acid ester in the form of a water-insoluble yellow oil.

Calculated for a molecular weight of 372 (percent): P, 8.4; S, 25.8. Found (percent): P, 8.6; S, 26.0.

EXAMPLE 6

(a)

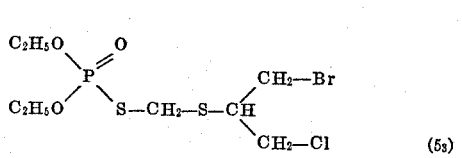
(5₃)

0.3-molar mixture:

56 g. ammonium O,O-diethyl-thiolphosphate are dissolved in 400 ml. acetonitrile; and 72 g. chloromethyl-1-bromo-3-chloro-prop-2-yl thioether are added at +20° C., with stirring, to this solution. The temperature of the mixture rises to 35 to 40° C. The reaction mixture is kept at 40° C. for a further hour and then worked up as in Example 4. There are thus obtained 98 g. (88% of the theory) of O,O - diethyl-S-(1-bromo-3-chloro-prop-2-yl-mercaptomethyl)-thiolphosphoric acid ester as colorless, water-insoluble oil.

Calculated for a molecular weight of 372 (percent): P, 8.4; S, 17.3. Found (percent): P, 8.6; S, 17.2.

(b) The chloromethyl-1-bromo-3-chloro-prop-2-yl thioether usable according to Examples 4 to 6 as starting material can be obtained for example as follows:

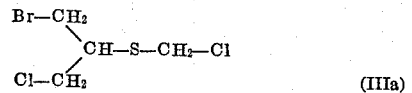
(IIIa)

1-molar mixture:

38 g. paraformaldehyde are suspended in 250 ml. benzene. To this suspension there are first added, with stirring, 500 ml. concentrated hydrochloric acid; there are then added dropwise at 40 to 45° C., with further stirring, 190 g. 1-bromo-3-chloro-prop-2-ylmercaptan, and the mixture is stirred for a further 2 hours at 45° C. The benzene solution is then separated, washed twice with, in each case, 50 ml. ice water, and the organic phase is dried over sodium sulfate. In the ensuing fractional distillation, 165 g. (69% of the theory) chloromethyl-1-bromo-3-chloro-prop-2-yl thioether of B.P. 98° C./1 mm. Hg are obtained.

EXAMPLE 7

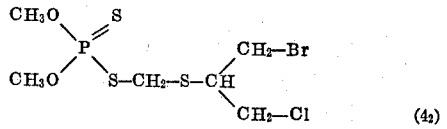
(4₂)

0.4-molar mixture:

To a solution of 63 g. O,O-dimethyl-thionothiolphosphoric acid in 300 ml. acetonitrile, there is added at 0° C., with stirring, a sodium methylate solution which contains 0.4 mol sodium; 95 g. chloromethyl-1-bromo-3-chloro-prop-2-yl thioether are then added at 0° C. to the mixture, with further stirring. The temperature of the reaction mixture rises slowly to 50° C. The mixture is heated to this temperature for a further 2 hours and then poured into 300 ml. ice water. 200 ml. benzene are subsequently added. The mixture is shaken and the benzene solution is then separated off. After drying of the latter, solvent is distilled off. There are so obtained 127 g. (88% of the theory) of O,O-dimethyl-S-(1-bromo-3-chloro-prop-2-yl-mercaptomethyl)-thionothiolphosphoric acid ester as yellow, water-insoluble oil.

Calculated for a molecular weight of 360.5 (percent): S, 26.7; P, 8.7. Found (percent): S, 26.9; P, 8.9.

EXAMPLE 8

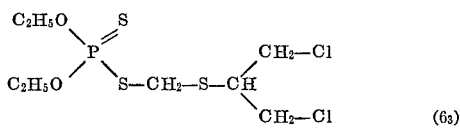

0.35-molar mixture:

68 g. chloromethyl - 1,3 - dichloro-prop-2-yl-thioether (B.P. 80° C./2 mm. Hg) are dissolved in 100 ml. acetonitrile; to this solution there are added at 10 to 20° C., with stirring, 78 g. sodium O,O-diethyl-thionothiolphosphate dissolved in 200 ml. acetonitrile. The mixture is stirred for a further hour at 40° C. and then worked up as in Example 7. There are obtained 120 g. (about 99% of the theory) of O,O-diethyl-S-(1,3-dichloro-prop-2-yl-mercaptomethyl)-thionothiolphosphoric acid ester in the form of a colorless, water insoluble oil with the refractive index $n_D^{23}=1.5560$.

Calculated for a molecular weight of 343 (percent): P, 9.03; S, 27.9; Cl, 20.7. Found (percent): P, 9.3; S, 27.9; Cl, 20.5.

EXAMPLE 9

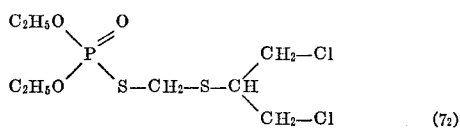

0.35-molar mixture:

67 g. ammonium O,O-diethyl-thiolphosphate dissolved in 250 ml. acetonitrile are added at 10 to 20° C., with stirring, to a solution of 68 g. chloromethyl-1,3-dichloro-prop-2-yl thioether in 100 ml. acetonitrile. The solution is heated to 40 to 45° C. for a further hour, with continued stirring, and then worked up as described in Example 7. O,O - diethyl-S-(1,3-dichloro-prop-2-yl-mercaptomethyl)-thionothiolphosphoric acid ester is obtained as water-insoluble, slightly yellow oil with the refractive index $n_D^{23}=1.5219$. The yield is 107 g. (93% of the theory).

EXAMPLE 10

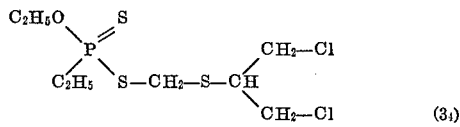

0.35-molar mixture:

68 g. chloromethyl-1,3-dichloro-prop-2-yl thioether are dissolved in 100 ml. acetonitrile, the stoichiometric amount of potassium ethyl-O-ethyl-thionothiolphosphonate dissolved in 200 ml. acetonitrile is added at 10 to 20° C., with stirring, the reaction mixture is stirred at 40 to 50° C. for a further hour and it is then worked up as in Example 7. 105 g. ethyl-O-ethyl-S-(1,3-dichloro-prop - 2 - yl-mercaptomethyl)-thionothiolphosphonic acid ester are obtained as slightly yellow, water-insoluble oil (92% of the theory) with the refractive index $n_D^{23}=1.5721$.

Calculated for a molecular weight of 327 (percent): P, 9.5; S, 29.3; Cl, 21.7. Found (percent): P, 9.8; S, 29.0; Cl, 21.1.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phosphorus acid ester of the formula

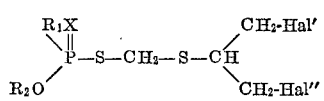

in which $R_1$ is selected from the group consisting of alkyl of 1–4 carbon atoms and alkoxy of 1–4 carbon atoms, $R_2$ is alkyl of 1–4 carbon atoms, X is selected from the group consisting of oxygen and sulfur, and Hal' and Hal" each individually is selected from the group consisting of chloro and bromo.

2. Compound according to claim 1 wherein $R_1$ is selected from the group consisting of $C_{1-3}$ alkyl and $C_{1-3}$ alkoxy, $R_2$ is $C_{1-3}$ alkyl, X is selected from the group consisting of oxygen and sulfur, Hal' is selected from the group consisting of chloro and bromo, and Hal" is chloro.

3. Compound according to claim 1 wherein $R_1$ is selected from the group consisting of $C_{1-2}$ alkyl and $C_{1-2}$ alkoxy, $R_2$ is $C_{1-3}$ alkyl, X is selected from the group consisting of oxygen and sulfur, Hal' is selected from the group consisting of chloro and bromo, and Hal" is chloro.

4. Compound according to claim 1 wherein such compound is O,O-diethyl-S-(1-bromo-3-chloro-prop-2-yl-mercaptomethyl)-thionothiol phosphoric acid ester of the formula

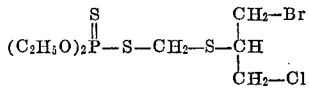

5. Compound according to claim 1 wherein such compound is ethyl-O-ethyl-S-(1 - bromo-3-chloro-prop-2-yl-mercaptomethyl)-thionothiol phosphonic acid ester of the formula

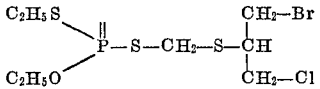

6. Compound according to claim 1 wherein such compound is ethyl-O-ethyl-S-(1,3-dichloro-prop-2-yl-mercaptomethyl)-thionothiol phosphonic acid ester of the formula

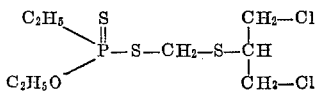

7. Compound according to claim 1 wherein such compound is O,O-dimethyl-S-(1-bromo - 3 - chloro-prop-2-yl-mercaptomethyl)-thionothiol phosphoric acid ester of the formula

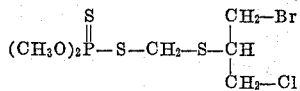

8. Compound according to claim 1 wherein such compound is O,O-diethyl-S-(1-bromo - 3 - chloro-prop-2-yl-mercaptomethyl)-thiol phosphoric acid ester of the formula

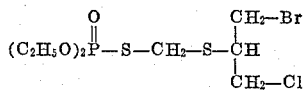

9. Compound according to claim 1 wherein such compound is O,O-diethyl-S-(1,3 - dichloro-prop - 2 - yl-mercaptomethyl)-thionothiol phosphoric acid ester of the formula

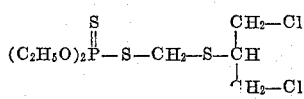

10. Compound according to claim 1 wherein such compound is O,O - diethyl - S - (1,3 - dichloro-prop - 2 - yl-mercaptomethyl)-thiol phosphoric acid ester of the formula

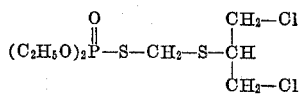

References Cited
UNITED STATES PATENTS

| | | | |
|---|---|---|---|
| 3,277,215 | 10/1966 | Schrader et al. | 260—948 |
| 3,442,984 | 5/1969 | Dickhaeuser et al. | 260—948 |

LEWIS GOTTS, Primary Examiner

A. H. SUTTO, Assistant Examiner

U.S. Cl. X.R.

260—609 R; 424—216